United States Patent
Langendoen

(10) Patent No.: US 8,414,215 B2
(45) Date of Patent: Apr. 9, 2013

(54) SEALING STRUCTURE FOR USE WITH A BALL AND SOCKET JOINT

(75) Inventor: Ken Langendoen, Fenwick (CA)

(73) Assignee: TRW Automotive U.S. LLC, Livonia, MI (US)

( * ) Notice: Subject to any disclaimer, the term of this patent is extended or adjusted under 35 U.S.C. 154(b) by 358 days.

(21) Appl. No.: 12/267,008

(22) Filed: Nov. 7, 2008

(65) Prior Publication Data
US 2010/0119297 A1 May 13, 2010

(51) Int. Cl.
*F16C 11/00* (2006.01)
(52) U.S. Cl. .......................... 403/134; 277/635
(58) Field of Classification Search ................ 277/634, 277/635, 636, 559, 560; 403/50, 51, 134, 403/122
See application file for complete search history.

(56) References Cited

U.S. PATENT DOCUMENTS

| | | | | |
|---|---|---|---|---|
| 2,643,147 A | * | 6/1953 | Funkhouser et al. | 277/560 |
| 2,786,359 A | * | 3/1957 | Karlan et al. | 403/50 |
| 2,793,889 A | * | 5/1957 | Potter, Jr. | 277/560 |
| 3,144,256 A | * | 8/1964 | Wright | 277/436 |
| 3,187,590 A | * | 6/1965 | Duggan | 403/51 |
| 3,279,832 A | * | 10/1966 | Bergman | 403/51 |
| 3,368,650 A | * | 2/1968 | Wasdell | 188/322.17 |
| 3,973,781 A | * | 8/1976 | Grorich | 277/559 |
| 4,241,928 A | * | 12/1980 | Nemoto et al. | 277/635 |
| 4,650,362 A | * | 3/1987 | Kubo | 403/134 |
| 4,678,064 A | * | 7/1987 | Adachi et al. | 188/73.45 |
| 4,695,061 A | * | 9/1987 | Meisner et al. | 277/502 |
| 4,744,571 A | * | 5/1988 | Geberth, Jr. | 277/556 |
| 4,852,891 A | * | 8/1989 | Sugiura et al. | 277/636 |
| 4,865,170 A | * | 9/1989 | Ciepichal | 188/322.17 |
| 4,869,514 A | * | 9/1989 | Bogdanovic | 277/560 |
| 4,886,281 A | * | 12/1989 | Ehrmann et al. | 277/560 |
| 4,921,368 A | * | 5/1990 | Busse et al. | 403/134 |
| 4,995,623 A | * | 2/1991 | Wada et al. | 277/552 |
| 5,066,159 A | * | 11/1991 | Urbach | 403/134 |
| 5,380,114 A | | 1/1995 | Urbach | |
| 5,498,092 A | * | 3/1996 | Fellows | 403/12 |
| 5,558,580 A | * | 9/1996 | Okuyama | 464/175 |
| 5,601,378 A | * | 2/1997 | Fukukawa et al. | 403/140 |
| 5,678,947 A | | 10/1997 | Urbach et al. | |

(Continued)

FOREIGN PATENT DOCUMENTS

DE 19803056 A1 7/1999
WO WO 2007012396 A1 * 2/2007

OTHER PUBLICATIONS

PCT International Search Report (PCT/US2009/063517).

*Primary Examiner* — Michael P Ferguson
*Assistant Examiner* — Daniel Wiley
(74) *Attorney, Agent, or Firm* — MacMillan, Sobanski & Todd LLC

(57) ABSTRACT

A ball joint assembly includes an elongated stud, a socket housing, and a boot and seal assembly having a seal lip. A boot and seal assembly for use in a ball joint assembly includes a body and a diaphragm extending therefrom. The diaphragm includes a seal portion having a seal lip that has an elongated profile of a substantially uniform section. The seal portion may be a first seal portion that is adapted to engage an elongated stud of a ball joint assembly. The diaphragm further may include a second seal portion that is adapted to engage a mating component connected to the ball joint assembly. The boot and seal assembly may include a third seal portion that is also adapted to engage the mating component.

13 Claims, 6 Drawing Sheets

U.S. PATENT DOCUMENTS

| | | | |
|---|---|---|---|
| 5,855,448 A * | 1/1999 | Showalter et al. | 403/134 |
| 5,882,137 A * | 3/1999 | Epp et al. | 403/135 |
| 5,931,597 A | 8/1999 | Urbach | |
| 5,997,208 A | 12/1999 | Urbach et al. | |
| 6,010,271 A | 1/2000 | Jackson et al. | |
| 6,168,164 B1 * | 1/2001 | Toth et al. | 277/559 |
| 6,250,840 B1 | 6/2001 | Urbach et al. | |
| 6,254,114 B1 | 7/2001 | Pulling | |
| 6,276,702 B1 * | 8/2001 | Turck et al. | 280/93.511 |
| 6,308,959 B1 * | 10/2001 | Sokolihs et al. | 277/394 |
| 6,334,620 B1 * | 1/2002 | Reetz et al. | 277/635 |
| 6,502,831 B2 | 1/2003 | Jarrus | |
| 6,527,468 B1 | 3/2003 | Lindquist et al. | |
| 6,582,146 B2 | 6/2003 | Raymoure | |
| 6,652,179 B2 * | 11/2003 | De Freitas | 403/134 |
| 6,773,197 B2 | 8/2004 | Urbach | |
| 6,814,521 B2 * | 11/2004 | Suzuki et al. | 403/134 |
| 6,834,863 B2 * | 12/2004 | Urbach | 277/635 |
| 6,860,486 B2 * | 3/2005 | Hacker et al. | 277/553 |
| 6,935,803 B2 * | 8/2005 | Abels et al. | 403/50 |
| 7,004,471 B2 * | 2/2006 | Bryde et al. | 277/318 |
| 7,192,214 B2 * | 3/2007 | Schonhoff et al. | 403/134 |
| 7,237,978 B2 * | 7/2007 | Fischer et al. | 403/50 |
| 7,367,743 B2 | 5/2008 | Bernhardt et al. | |
| 7,465,100 B2 * | 12/2008 | Matsui | 384/486 |
| 7,959,159 B2 * | 6/2011 | Hocker et al. | 277/559 |
| 2003/0160397 A1 * | 8/2003 | Sakata | 277/634 |
| 2003/0222412 A1 * | 12/2003 | Urbach | 277/634 |
| 2004/0232629 A1 * | 11/2004 | Schonhoff et al. | 277/635 |
| 2005/0036827 A1 * | 2/2005 | Bohne et al. | 403/12 |
| 2005/0207830 A1 * | 9/2005 | Brunneke | 403/122 |
| 2006/0193680 A1 * | 8/2006 | Suzuki | 403/122 |
| 2007/0048081 A1 * | 3/2007 | Elterman et al. | 403/122 |
| 2007/0065227 A1 * | 3/2007 | Sellers et al. | 403/122 |
| 2007/0140783 A1 * | 6/2007 | O'Bryan et al. | 403/122 |
| 2007/0166096 A1 * | 7/2007 | Lim et al. | 403/50 |
| 2008/0038051 A1 * | 2/2008 | Broker et al. | 403/134 |
| 2008/0056811 A1 * | 3/2008 | Urbach | 403/122 |
| 2009/0209353 A1 | 8/2009 | Abels et al. | |
| 2010/0086347 A1 * | 4/2010 | Bernhardt et al. | 403/134 |
| 2010/0237567 A1 * | 9/2010 | Kurth et al. | 277/559 |

* cited by examiner

SEALING STRUCTURE FOR USE WITH A BALL AND SOCKET JOINT

BACKGROUND OF THE INVENTION

This invention relates in general to joints having first and second members that can pivot or otherwise articulate angularly relative to one another. In particular, this invention relates to an improved sealing structure for use with an angularly movable joint, such as a ball and socket joint, that provides a reliable seal when the first and second components of the joint are articulated at relatively large angles relative to one another.

A variety of joints are known in the art that include first and second members that can pivot or otherwise articulate angularly relative to one another. One such angularly movable joint is known as a ball and socket joint. A typical ball and socket joint includes a ball stud portion and a socket portion. The ball stud portion of the joint includes a generally spherical ball having an elongated stud extending therefrom. The socket portion of the joint includes a generally spherical surface having an opening formed therethrough. When the ball and socket joint is assembled, the spherical ball of the ball stud portion is supported on the spherical surface of the socket portion, and the elongated stud of the ball stud portion extends through the opening of the socket portion. Thus, the ball stud can pivot or otherwise angularly move relative to the socket.

Ball and socket joints and other joints of this general type are typically provided with a sealing structure to protect the region where the first and second components thereof engage one another. These sealing structures prevent the entry of contaminants into the joint, which can adversely affect the operation of the joint and cause premature failure thereof. Such sealing structures also retain lubricant within the region where the first and second components thereof engage one another. In particular, ball and socket joints are frequently used in relatively harsh environments, such as in the suspension and steering systems of a variety of land vehicles, where they are directly exposed to water, dirt, and other contaminants.

A number of sealing structures are known in the art for use with conventional articulating joints. Although known sealing structures have been effective, it has been found that the ability of the sealing structure to prevent the entry of contaminants into the joint and to retain lubricant therein may be reduced somewhat when the first and second components of the joint are articulated at relatively large angles relative to one another. Thus, it would be desirable to provide an improved sealing structure for use with an angularly movable joint, such as a ball and socket joint, that provides a reliable seal when the first and second components of the joint are articulated at relatively large angles relative to one another.

SUMMARY OF THE INVENTION

This invention relates to an improved sealing structure for use with an angularly movable joint, such as a ball and socket joint, that provides a reliable seal when the first and second components of the joint are articulated at relatively large angles relative to one another.

Various aspects of this invention will become apparent to those skilled in the art from the following detailed description of the preferred embodiments, when read in light of the accompanying drawings.

BRIEF DESCRIPTION OF THE DRAWINGS

FIG. 1A is an enlarged elevational view, partially in cross section, of a portion of the first embodiment of a sealing structure illustrated in FIG. 1.

DETAILED DESCRIPTION OF THE PREFERRED EMBODIMENTS

Figure 1:
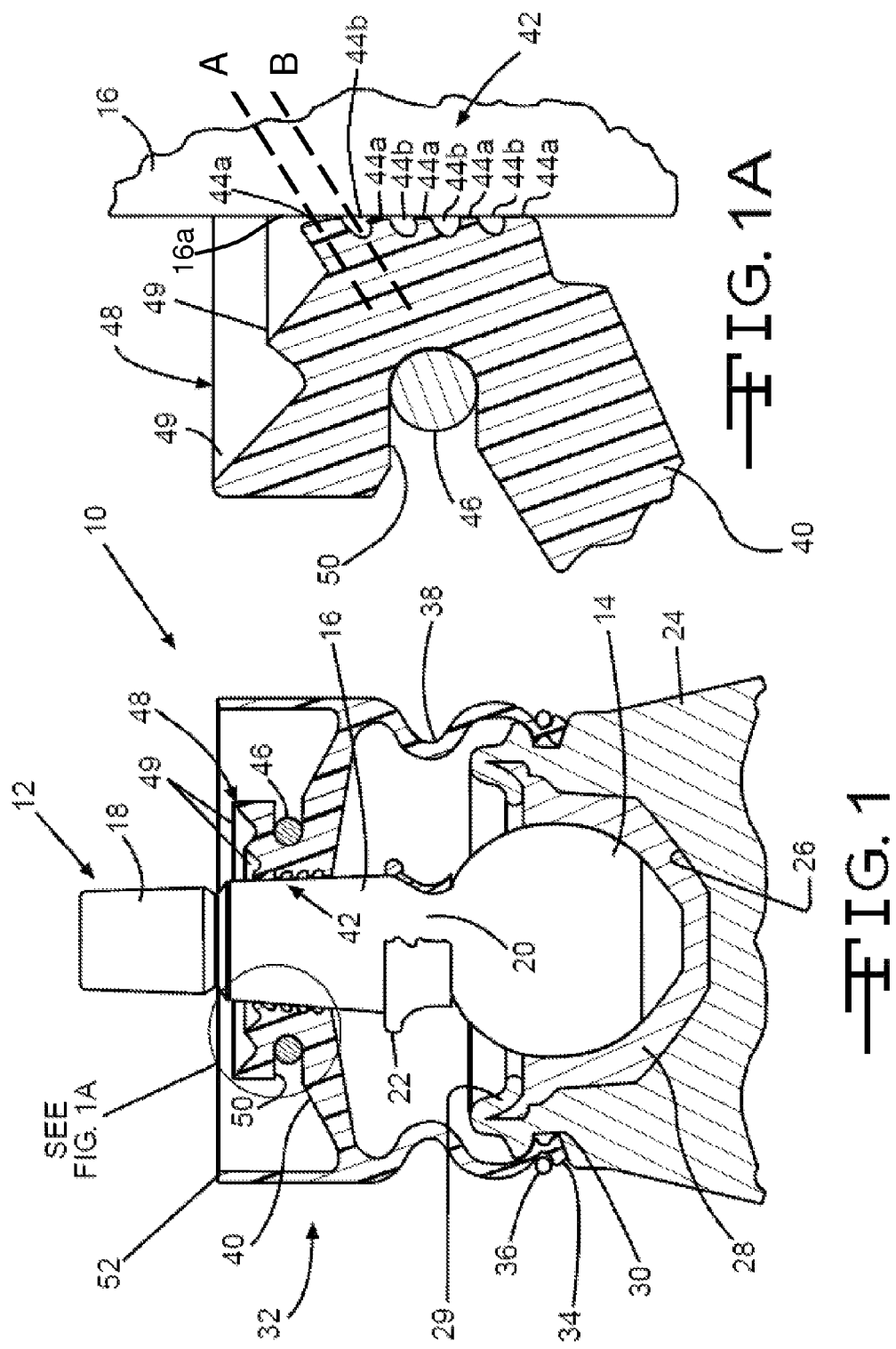
FIG. 1 is a side elevational view, partially in cross section, of a ball and socket joint including a first embodiment of a sealing structure in accordance with this invention.
Figure 2:
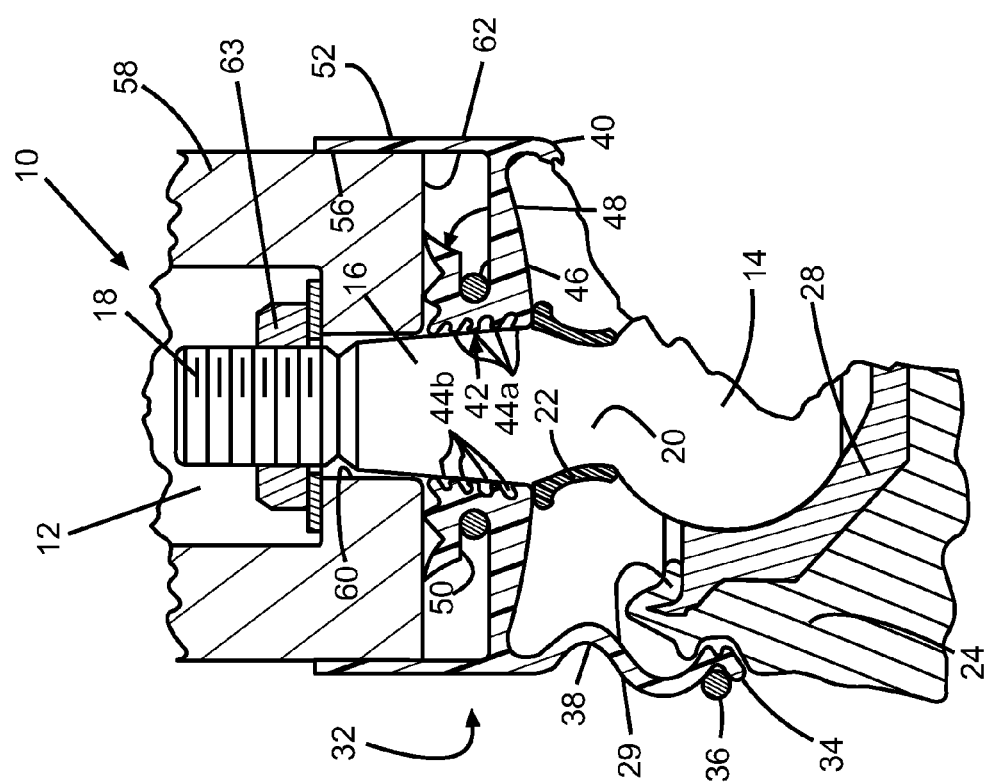
FIG. 2 is a side elevational view, partially in cross section, of the ball and socket joint and sealing structure illustrated in FIG. 1 shown assembled between first and second components and in an unarticulated condition.
Figure 3:
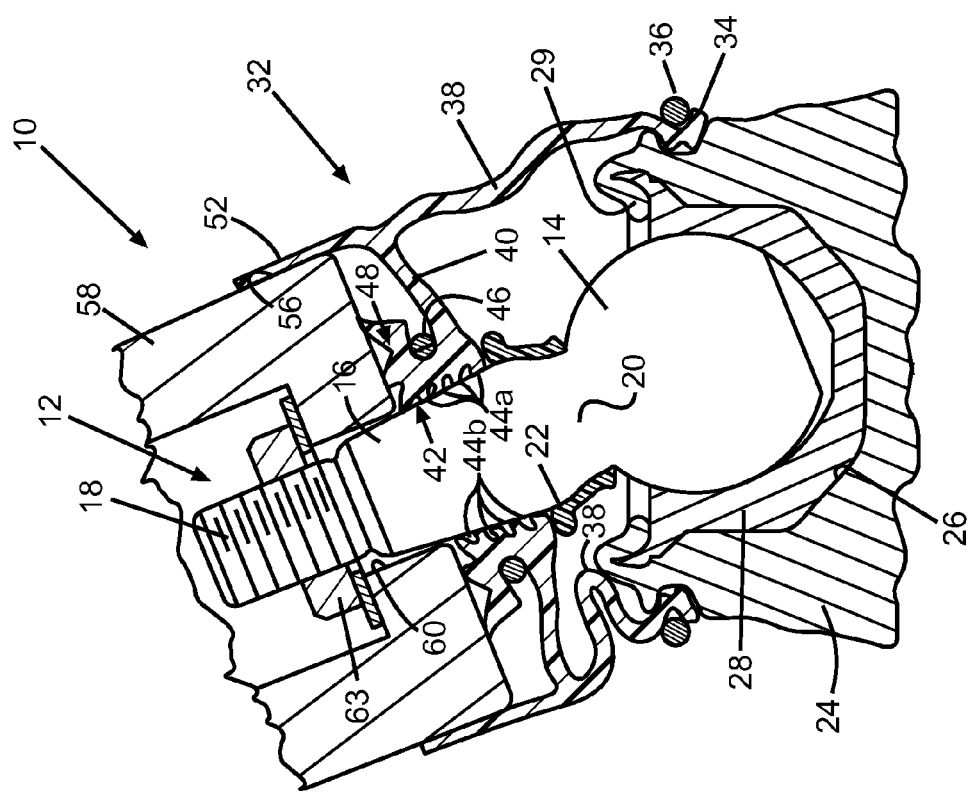
FIG. 3 is a side elevational view, partially in cross section, of the ball and socket joint and sealing structure of FIGS. 1 and 2 shown in an articulated condition.

Referring now to the drawings, there is illustrated in FIGS. 1, 2, and 3 a ball and socket joint, indicated generally at 10, in accordance with this invention. The illustrated ball and socket joint 10 is, in large measure, conventional in the art and is intended merely to illustrate one environment in which this invention may be used. Thus, the scope of this invention is not intended to be limited for use with the specific structure for the ball and socket joint 10 illustrated in FIG. 1 or with ball and socket joints in general. On the contrary, as will become apparent below, this invention may be used in any desired environment for the purposes described below.

The illustrated ball and socket joint 10 includes a ball stud portion, indicated generally at 12, that includes a spherical ball 14, an elongated stud 16 that extends from the spherical ball 14, and a fastener end 18 that extends from the elongated stud 16. The illustrated elongated stud 16 tapers from a relatively larger end adjacent the spherical ball 14 to a relatively smaller end adjacent to the fastener end 18, although such is not required. The fastener end 18 can be externally threaded as shown or provided with any other conventional securement structure for a purpose that will be explained below.

A reduced diameter region 20 may be provided between the ball 14 and the portion of the elongated stud 16 adjacent thereto. The reduced diameter region 20 may provide additional clearance to articulate the elongated stud 16 to extreme angular positions. A seal support collar 22 may be positioned around the reduced diameter region 20, if so desired, for a purpose that will be explained below. The seal support collar 22 may alternatively be omitted altogether or positioned at any other desired point on the elongated stud 16.

The illustrated ball and socket joint 10 also includes a socket housing 24 having a bushing socket 26 formed therein. The bushing socket 26 has an open end and further defines an interior space that receives a bushing 28 therein. The bushing 28 includes an outer surface that is positioned within the bushing socket 26, an inner surface that supports the spherical ball 14 for relative rotation therewith, and an open end through which the elongated stud 16 extends. The bushing 28 is conventional in the art and may be shaped other than illustrated if desired. The bushing 28 can be retained within the bushing socket 26 by any retaining means such as, for example, a retaining lip 29 that may be formed integrally with the housing 24 as illustrated. Alternatively, the retaining means may be provided as a separate structure (such as, for example, a threaded cap, a snap ring, or other similar structure) that is connected to the bushing socket 26 to prevent the bushing 28 from being removed therefrom. The socket housing 24 may further include a seal retaining groove 30 or other retaining structure for a purpose that will be explained below.

The illustrated ball and socket joint 10 includes a sealing structure, such as a boot and seal assembly, indicated generally at 32. The boot and seal assembly 32 includes a retaining end 34 that engages the socket housing 24. As shown in FIGS. 1, 2, and 3, the retaining end 34 of the boot and seal assembly 32 extends about and into the seal retaining groove 30 provided on the socket housing 24. The retaining end 34 of the boot and seal assembly 32 may further include a first retaining ring 36 or any other suitable retaining structure, though such is not required. The retaining end 34 may function to seal out contamination, retain lubricant within the ball and socket joint 10, and secure the boot and seal assembly 32 to the socket housing 24.

The illustrated boot and seal assembly 32 further includes a body 38 that extends from the retaining end 34. The illustrated body 38 is generally hollow and cylindrical in shape, having a single rounded profile convolution. However, the body 38 may have any number of such convolutions having any desired geometry. The body 38 is provided to allow deflection of portions of the boot and seal assembly 32, while preventing a substantial separation of certain sealing surfaces from their respective seats, as described in detail below. The illustrated boot and seal assembly 32 also includes a diaphragm 40, which extends in a general radial direction from the body 38 toward the elongated stud 16. The diaphragm 40 is preferably formed integrally with the body 38 of the boot and seal assembly 32, although such is not required, and includes a first seal portion, indicated generally at 42, and a second seal portion, indicated generally at 48.

In the illustrated embodiment of FIG. 1A, the first seal portion 42 is a lip seal that includes a plurality of laterally spaced apart seal lips 44*a* that surround and engage the outer surface of the elongated stud 16. The seal lips 44 may be concentric or of the same diameter, if so desired. The seal lips 44*a* each define a generally centrally-located seal lip longitudinal axis A that engages a sealing surface 16*a* of the elongated stud 16 at an acute angle. The seal lips 44*a* are separated by annular spaces 44*b* that are illustrated disposed in an alternating arrangement therewith. The annular spaces 44*b* permit the seal lips 44*a* to deflect when sealing contact is made with the elongated stud 16. The annular spaces 44*b* also define a generally centrally-located space longitudinal axis B, which in the illustrated embodiment is preferably located generally parallel with the seal lip axis A. Though described and illustrated as having seal lips 44*a*, the first seal portion 42 may be any structure suitable to seal against the elongated stud 16 and prevent contaminant entry therebetween. For example, the first seal portion 42 may be a plurality of spaced apart, triangularly shaped seal protrusions that contact and seal against the elongated stud 16. Alternatively, the first seal portion 42 may be a face seal that is configured as a generally flat, planar surface that contacts and seals against the elongated stud 16.

The illustrated seal lips 44*a* have a radially elongated profile of a substantially uniform section (i.e. cross section) when measured parallel to the sealing surface of the elongated stud 16. The geometry of the seal lips 44*a* facilitates a shear loading thereof against the elongated stud 16. Such a shear loading characteristic provides a substantially constant sealing pressure against the mating seal surface over the range of deflections of the seal lips 44*a*. The illustrated seal lips 44*a* are further dimensioned to fit against the surface of the elongated stud 16 such that they may be deflected when engaged against the surface of the elongated stud 16. The resilient nature of the seal material provides, in part, a sealing pressure for the seal lips 44*a* against the surface of the elongated stud 16. However, the first seal portion 42 may be embodied as any desired structure or combination of structures.

The first seal portion 42 may, if desired, be urged inwardly into engagement with the outer surface of the elongated stud 16 by a second retaining ring 46, that is conventional in the art. The second retaining ring 46 may be configured as a resilient band such as, for example, a garter spring in the form of a wound coil spring having ends connected together to form a complete circular ring. Alternatively, the second retaining ring 46 may be a closed ring structure or an open ended, solid ring structure having either overlapping or non-contacting ends.

In the illustrated embodiment, the second seal portion 48 of the diaphragm 40 is a face seal that includes a plurality (two in the illustrated embodiment) of annular concentric projections 49, though such a configuration is not required. Though described and illustrated as a plurality of annular concentric projections 49, the second sealing portion 42 may be embodied as any structure suitable to seal against a portion of a mating component 58 (as shown in FIGS. 2 and 3) and restrict or prevent contaminant entry therebetween. The second seal portion 48 is positioned adjacent to the diaphragm 40 and defines a groove 50 therebetween, in which the second retaining ring 46 may be disposed. The second seal portion 48 further provides a supplemental sealing function that further prevents contaminant intrusion, as will be explained below.

The boot and seal assembly 32 further includes a third seal portion 52 that, in the first embodiment of this invention, is an outer sealing member. The third seal portion 52 is illustrated as a generally hollow and cylindrical structure extending from the diaphragm 40, although such is not required. The third sealing portion 52 may be any shape that is suitable to engage an outer surface 56 of the mating component 58, as will be explained below. For example, the third sealing portion 52 may be circular, oval, square, or hexagonal in cross section. Furthermore, the third sealing portion 52 may be contoured to accommodate a projecting feature (not shown) that extends from the mating component 58.

Referring now to FIG. 2, the ball and socket joint 10 is illustrated in an engaged relationship with the mating component 58. To accomplish this, the elongated stud 16 of the ball and socket joint 10 extends through an aperture 60 provided in the mating component 58. The second seal portion 48 of the boot and seal assembly 32 engages an end surface 62 of the mating component 58 and functions to protect the first seal portion 42 from exposure to contaminants. As the mating component 58 is drawn into engagement on the elongated stud 16 (such as by a nut 63 threaded onto the fastener end 18 of the stud 16), the first seal portion 42 is pushed into sealing engagement with the outer surface of the elongated stud 16. At the same time, the second seal portion 48 may be deflected against the end surface 62 of the mating component 58. Sealing pressure is supplied, at least in part, by the restoring force of the resilient material of the boot and seal assembly 32 such that seal wear is compensated and contact remains between the first and second seal portions 42 and 48, respectively, and the corresponding mating surfaces. The second seal portion 48 may deflect the groove 50 to further trap and retain the second retaining ring 46. Part of the first seal portion 42 may locate against the seal support collar 22 in order to provide a seal stop position. The seal support collar 22 also helps to maintain contact of the second seal portion 48 against the end surface 62.

FIG. 3 illustrates the ball and socket joint 10 including the boot and seal assembly 32 and the mating component 58 in an articulated position. As shown therein, the portion of the body 38 compresses or folds over substantially at the point where the ball stud portion 12 is articulated toward the socket housing 24. At the same time, another portion of the body 38, at the opposite position of the ball stud portion 12, is deflected away from the socket housing 24. The third sealing portion 52 engages the outer surface 56 sufficiently to maintain contact throughout the articulation of the ball and socket joint 10. When the mating component 58 rotates relative to the housing 12 about an axis coincident with the ball stud portion 12, the spherical ball 14 rotates relative to the bushing 28. During large relative rotations, the first seal portion 42 moves relative to the ball stud portion 12, the second seal portion 48 moves relative to the end surface 62, and the third seal portion 52 moves relative to the mating component 58. Small relative rotations may cause the third sealing portion 52 to remain substantially fixed to the mating component 58 while the body 38 deforms, though such a fixed relationship is not required.

In operation, as the stud 16 articulates and rotates relative to the first and second seal portions 42 and 48, respectively, wear or dimensional degradation of the seal lips 44a and the projections 49 is compensated by the relatively constant pressure of the seals deflected against the sealing surfaces. Referring to FIG. 1A, the seal lips 42 may be deflected into the adjacent channels 44b at initial installation. During the useful life of the first seal portion 42, the seal lips 44a may wear and deflect away from the channels 44b. Because of the shear loading of the seal lips 44a against the stud 16, the sealing pressure and sealing capability is substantially constant. The constant pressure of the resilient material, loaded in shear, provides relatively constant seal wear compensation over the life of the seal. This pressure may be further augmented by the second retaining ring 46. However, the first and second seal portions 42 and 48, respectively, may have any sealing pressure profile or characteristic desired.

Figure 4:
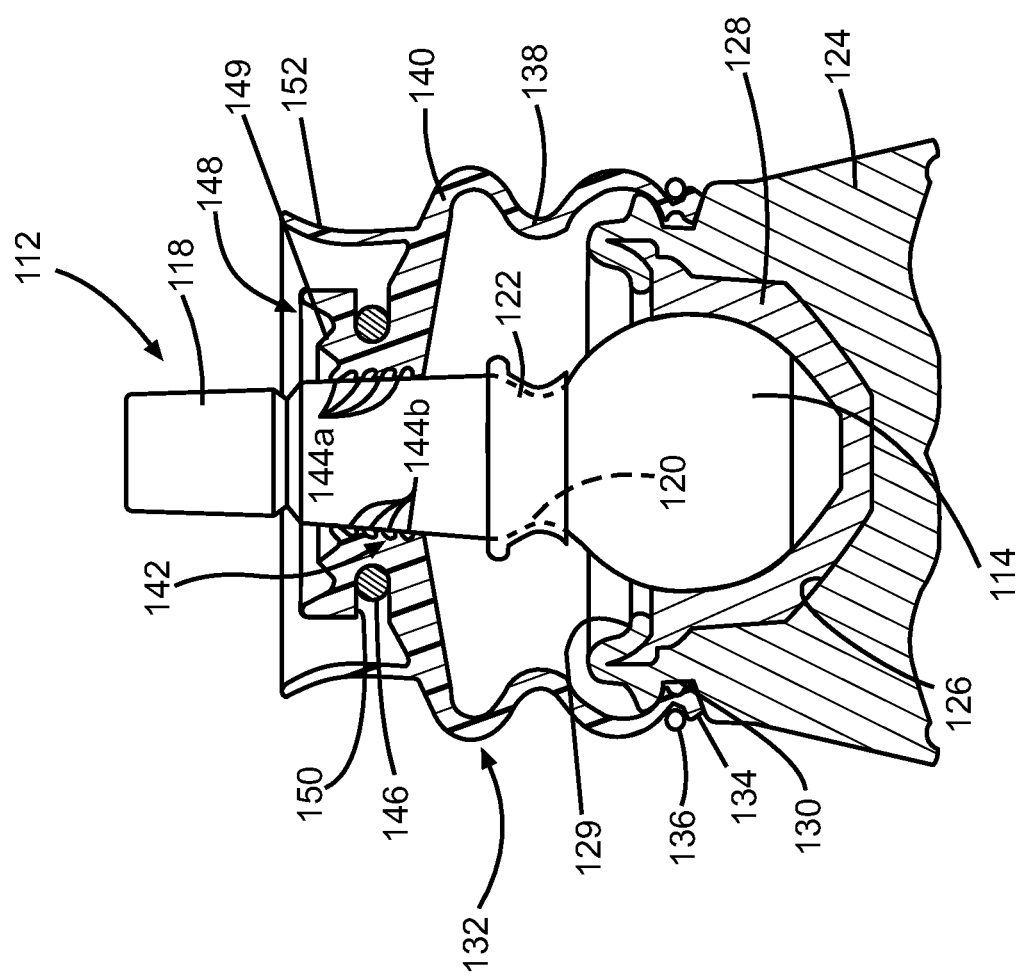
FIG. 4 is a side elevational view, partially in cross section, of a ball and socket joint including a second embodiment of a sealing structure in accordance with this invention.

Referring now to FIG. 4, there is illustrated a second embodiment of a ball and socket joint, shown generally at 110. Where possible, similar reference numbers are used to indicate common elements or features. The operation and relative connections of a ball stud portion 112, a socket housing 124, a bushing 128, and a mating component 158 are the same as described above in the first embodiment. The ball stud portion 112 includes a spherical ball 114, an elongated stud portion 116, and a fastener end 118. The ball stud portion 112 may also include a reduced diameter region 120 and a seal support collar 122. The socket housing 124 includes a bushing socket 126 and may also include a retaining lip 129 if so desired. The mating component 158 includes an outer surface 156 and an aperture 160.

Figure 5:
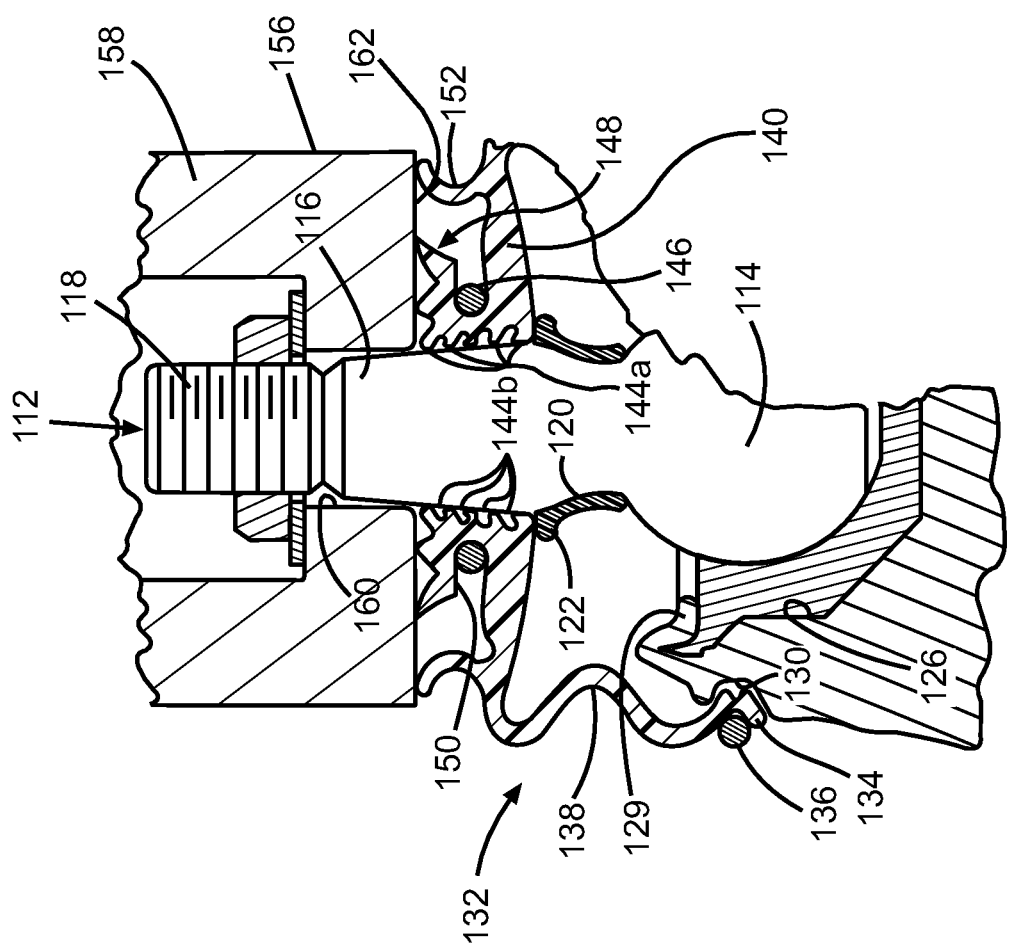
FIG. 5 is a side elevational view, partially in cross section, of the ball and socket joint and sealing structure illustrated in FIG. 4 shown assembled between first and second components and in an unarticulated condition.
Figure 6:
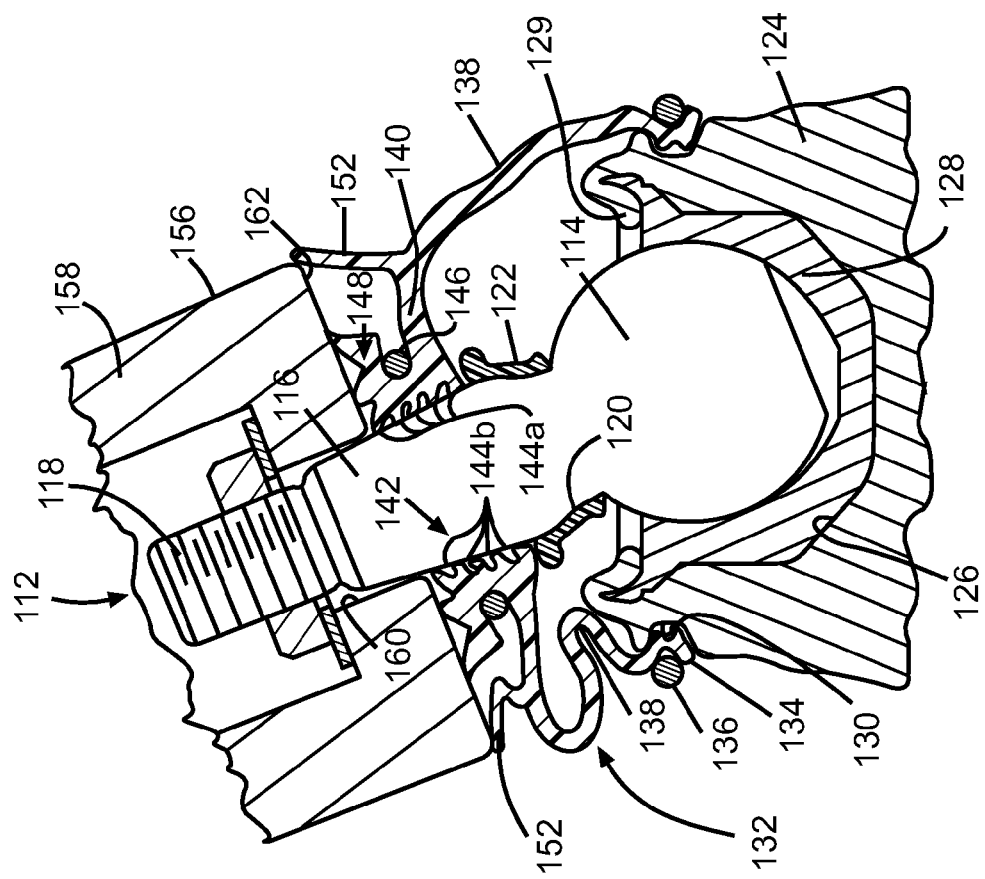
FIG. 6 is a side elevational view, partially in cross section, of the ball and socket joint and sealing structure illustrated in FIGS. 4 and 5 shown in an articulated condition.

The second embodiment of a boot and seal assembly 132 includes similar elements and functionality to the first embodiment boot and seal assembly 32 described above. For example, a first end 134 is retained within a seal retaining groove 130 by a first retaining ring 136. Also, a body 138 is deflected or articulated, as shown in FIGS. 5 and 6, in a similar mode to the body 38 of the first embodiment. Some elements of the boot and seal assembly 132 are distinct from corresponding elements of the first embodiment boot and seal assembly 32, as will be described below. Other elements of the second embodiment boot and seal assembly 132 may be alternative variations of the first embodiment boot and seal assembly 32 and, accordingly, may also be included thereon.

The second embodiment of the boot and seal assembly 132 includes a diaphragm 140, as shown in FIG. 4. The diaphragm 140 includes a first seal portion 142 and a second seal portion 148 that are similar in layout, function, and operational characteristics to the first seal portion 42 and the second seal portion 48 described above. A second retaining ring 146 is contained within a groove 150 defined between the diaphragm 140 and the second seal portion 148. The structure and function of the second retaining ring 146 is similar to the second retaining ring 46 of the first embodiment. The first seal portion 142 includes a plurality of seal lips 144a and alternating channels 144b. Though illustrated as being configured similarly to the first seal portion 42 of FIG. 1A, such is not required. The diaphragm 140 further includes a third seal portion 152. The third seal portion 152 is illustrated in FIG. 4 as extending from the diaphragm 142, though such is not required. Rather, the third seal portion 152 may extend from any suitable point on the body 138 or the diaphragm 140. Additionally, though the third seal portion 152 is shown integrally formed with the diaphragm 140, such is not required. The third seal portion 152 may be a separate structure and may also be fitted about the second seal portion 148 or the groove 150, if so desired.

FIG. 5 illustrates the second embodiment of the boot and seal assembly 132 in a deflected state with the installed mating component 158, similar to that of the first embodiment as described above. The third seal portion 152 engages a portion of the mating component end surface 162. The third seal portion 152 is further compressed against the end surface 162 as the mating component 158 engages the ball stud portion 112. The first seal portion 142 engages the elongated stud 116 of the ball stud portion 112 and the second seal portion 148 engages the end surface 162 of the mating component 158, as described above in the first embodiment. The third seal portion 152 of FIG. 5 engages the end surface 162 of the mating component 158 and is shown deflected inwardly in an arcuate shape, though any deflected shape may be provided. For example, the third seal portion 152 may bulge outwardly or have a convoluted profile that locates on the end surface 162.

FIG. 6 illustrates the ball and socket joint 110, the boot and seal assembly 132, and the mating component 158 in an articulated position, which is similar to FIG. 3. The third seal portion 152 exhibits more compressive deflection at the point where the ball stud portion 112 is articulated closer to the socket housing 124. Conversely, the opposite side of the third seal portion 152 expands, or returns to an approximated free state condition in order to follow the end surface 162 of the mating component 158. At or near the extreme ends of articulation, as depicted in FIG. 6, the tip of the third seal portion 152 may unseat from the end surface 162. Alternatively, the third seal portion 152 may be configured so as to remain fully in contact with the end surface 162.

The first embodiment boot and seal assembly 32 and the second embodiment boot and seal assembly 132 may be made from any suitable elastomeric material such as, for example, natural rubber; fluoroelastomer synthetic rubber such as, for example, Viton®; chloroprene synthetic rubber, such as, for example, Neoprene®; and thermoplastic elastomers such as, for example, Hytrel® and Santoprene®. The materials presented are not intended to be exhaustive, but merely indicative of various classes of flexible, water-impervious materials that may be suitable for such boot configurations. Other flexible materials may be used, if so desired. The embodiments of the boot and seal assemblies 32 and 132 may further be made by any suitable process such as, for example, injection molding, blow molding, steam forming, and the like.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A ball joint assembly comprising:
    a ball stud having an elongated stud portion that extends between a spherical ball end and a fastener end, the ball stud further including a seal support collar disposed between the spherical ball end and the elongated stud portion, the elongated stud portion having a conical sealing surface, wherein a diameter of the conical sealing surface decreases between the spherical ball end and the fastener end;
    a socket housing supporting the spherical ball end for relative movement;
    a boot and seal assembly including a body having a retaining end that is engaged with the socket housing, and a diaphragm extending from the body towards the elongated stud portion, the diaphragm including a seal portion comprising a plurality of annular seal lips separated by alternating spaces to permit deflection of the plurality of annular seal lips, each of the plurality of annular seal lips having an elongated cross-sectional profile of generally uniform thickness and terminating in a generally flat seal surface, each of the plurality of seal lips further defining a seal lip axis extending therethrough, wherein each of the seal lip axes of the plurality of seal lips forms an acute angle with the conical sealing surface;
    whereby in an installed configuration:
        a mating component is connected to the fastener end of the ball stud such that the mating component engages an upper end of the seal portion;
        the seal support collar engages a lower end of the seal portion; and
        each of the flat seal surfaces of the plurality of annular seal lips engages the conical sealing surface of the elongated stud portion to provide a fixed seal stop position of the annular seal lips along a portion of the conical sealing surface.

2. The ball joint assembly of claim 1 wherein the elongated stud portion defines a ball stud axis and the seal support collar limits the deflection of the annular seal lips against the conical sealing surface.

3. The ball joint assembly of claim 2 wherein the seal portion is a first seal portion, and the boot and seal assembly further comprises a second seal portion that includes a plurality of annular concentric projections that seal against the mating component and the seal support collar maintains contact of the second seal portion against the mating component.

4. The ball joint assembly of claim 3 wherein the seal support collar limits the deflection of the plurality of annular seal lips into the alternating spaces.

5. The ball joint assembly of claim 1 wherein a third seal portion extends from one of the body and the diaphragm, the third seal portion being adapted to engage the mating component.

6. The ball joint assembly of claim 5 wherein the third seal portion is generally hollow and cylindrical in shape and is adapted to engage an outer surface of the mating component.

7. A ball joint assembly comprising:
    a ball stud having an elongated stud portion that extends between a spherical ball end and a fastener end, the ball stud further including a fixed-position seal support collar disposed between the spherical ball end and the elongated stud portion, the elongated stud portion having a conical sealing surface, wherein a diameter of the conical sealing surface decreases between the spherical ball end and the fastener end;
    a socket housing supporting the spherical ball end for relative movement;
    a boot and seal assembly including a body having a retaining end that is engaged with the socket housing, and a diaphragm extending from the body towards the elongated stud portion, the diaphragm including a first seal portion and a second seal portion,
    the first seal portion having a plurality of annular seal lips separated by alternating spaces to permit deflection of the plurality of annular seal lips, each of the plurality of annular seal lips having an elongated cross-sectional profile of generally uniform thickness and terminating in a generally flat seal surface, each of the plurality of seal lips further defining a seal lip axis extending therethrough, wherein each of the seal lip axes of the plurality of seal lips forms an acute angle with the conical sealing surface;
    the second seal portion being formed integrally with and at an upper end of the first seal portion proximate the fastener end of the ball stud, the first and second seal portions forming a groove therebetween to permit deflection of the second seal portion relative to the first seal portion;
    whereby in an installed configuration:
        a mating component is connected to the fastener end of the ball stud such that the mating component engages the second seal portion;
        the seal support collar engages a lower end of the first seal portion; and
        each of the flat seal surfaces of the plurality of annular seal lips engages the conical sealing surface of the elongated stud portion to provide a seal stop position of the annular seal lips along a portion of the conical sealing surface.

8. The ball joint assembly of claim 7 wherein a retaining ring is disposed in the groove such that the first seal portion is urged inwardly into engagement with the conical sealing surface of the elongated stud portion.

9. The ball joint assembly of claim 7 wherein a third seal portion extends from one of the body and the diaphragm, the third seal portion being adapted to engage the mating component.

10. The ball joint assembly of claim 9 wherein the third seal portion is generally hollow and cylindrical in shape and is adapted to engage an outer surface of the mating component.

11. A ball joint assembly comprising:
    a ball stud having an elongated stud portion that extends between a spherical ball end and a fastener end, the ball stud further including a seal support collar disposed between the spherical ball end and the elongated stud portion, the elongated stud portion having a conical sealing surface, wherein a diameter of the conical sealing surface decreases between the spherical ball end and the fastener end;
    a socket housing supporting the spherical ball end for relative movement;
    a boot and seal assembly including a body having a retaining end and a retaining ring disposed onto the retaining end such that the retaining end is engaged with the socket housing, and a diaphragm extending from the body towards the elongated stud portion, the diaphragm including a first seal portion and a second seal portion, the first seal portion having a plurality of annular seal lips separated by alternating spaces to permit deflection of the plurality of annular seal lips, each of the plurality of annular seal lips having an elongated cross-sectional profile of generally uniform thickness and terminating in a generally flat seal surface, each of the plurality of seal lips further defining a seal lip axis extending therethrough, wherein each of the seal lip axes of the plurality of seal lips forms an acute angle with the conical sealing surface;

the second seal portion being formed integrally with and at an upper end of the first seal portion proximate the fastener end of the ball stud, the first and second seal portions forming a groove therebetween to permit deflection of the second seal portion relative to the first seal portion, the groove supporting a resilient band retaining ring that urges the first seal portion into sealing engagement with the tapered sealing surface of the elongated stud;

whereby in an installed configuration:

a mating component is connected to the fastener end of the ball stud such that the mating component engages the second seal portion;

the seal support collar engages a lower end of the first seal portion; and each of the flat seal surfaces of the plurality of annular seal lips engages the conical sealing surface of the elongated stud portion to provide a seal stop position of the annular seal lips along a portion of the conical sealing surface.

12. The ball joint assembly of claim 11 wherein a third seal portion extends from one of the body and the diaphragm, the third seal portion being adapted to engage the mating component.

13. The ball joint assembly of claim 12 wherein the third seal portion is generally hollow and cylindrical in shape and is adapted to engage an outer surface of the mating component.

* * * * *